United States Patent
Chen et al.

(10) Patent No.: US 10,963,597 B2
(45) Date of Patent: Mar. 30, 2021

(54) METHOD AND APPARATUS FOR ADAPTIVELY CONSTRUCTING THREE-DIMENSIONAL INDOOR SCENARIO

(71) Applicant: BEIHANG UNIVERSITY, Beijing (CN)

(72) Inventors: Xiaowu Chen, Beijing (CN); Qiang Fu, Beijing (CN); Bin Zhou, Beijing (CN); Qinping Zhao, Beijing (CN); Xiaotian Wang, Beijing (CN); Sijia Wen, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 490 days.

(21) Appl. No.: 15/873,739

(22) Filed: Jan. 17, 2018

(65) Prior Publication Data

US 2019/0018909 A1    Jan. 17, 2019

(30) Foreign Application Priority Data

Jul. 14, 2017  (CN) .......................... 2017 1 0573845

(51) Int. Cl.
*G06F 30/13*     (2020.01)
*G06F 17/12*     (2006.01)
(Continued)

(52) U.S. Cl.
CPC .............. *G06F 30/13* (2020.01); *G06F 17/12* (2013.01); *G06F 2111/10* (2020.01); *G06F 2111/20* (2020.01)

(58) Field of Classification Search
CPC ... G06F 30/13; G06F 2111/20; G06F 2111/10
(Continued)

(56) References Cited

U.S. PATENT DOCUMENTS 4,803,735 A * 2/1989 Nishida ................. G06K 9/46
 382/151
5,018,219 A * 5/1991 Matsuzaki ............... G06K 9/46
 382/195

(Continued)

FOREIGN PATENT DOCUMENTS

CN   104050722 A   9/2014
CN   105427373 A   3/2016
(Continued)

OTHER PUBLICATIONS

David C. Lee ("Three Dimensional Representation and Reasoning for Indoor Scene Understanding", Carnegie Mellon University, 2011, pp. 1-92) (Year: 2011).*

(Continued)

*Primary Examiner* — Iftekhar A Khan
(74) *Attorney, Agent, or Firm* — J.C. Patents

(57) ABSTRACT

Disclosed are a method and apparatus for adaptively constructing a three-dimensional indoor scenario, the method including: establishing an object association map corresponding to different scenario categories according to an annotated indoor layout; selecting a corresponding target indoor object according to room information inputted by a user and the object association map; generating a target indoor layout according to preset room parameters inputted by the user and the annotated indoor layout; and constructing a three-dimensional indoor scenario according to the target indoor object and the target indoor layout. The disclosed method and apparatus help improving the efficiency in constructing the three-dimensional scenario.

6 Claims, 4 Drawing Sheets

(51) Int. Cl.
*G06F 111/10* (2020.01)
*G06F 111/20* (2020.01)

(58) Field of Classification Search
USPC .......................................................... 703/1
See application file for complete search history.

(56) References Cited

U.S. PATENT DOCUMENTS

| | | | | |
|---|---|---|---|---|
| 5,392,361 | A * | 2/1995 | Imaizumi | G03F 9/70 |
| | | | | 382/260 |
| 5,560,005 | A * | 9/1996 | Hoover | G06F 16/27 |
| 5,761,385 | A * | 6/1998 | Quinn | G06K 9/00476 |
| | | | | 706/15 |
| 6,046,740 | A * | 4/2000 | LaRoche | G06K 9/00476 |
| | | | | 715/764 |
| 6,839,632 | B2 * | 1/2005 | Grace | G06T 17/20 |
| | | | | 702/16 |
| 7,860,854 | B2 * | 12/2010 | Lipson | G06F 16/583 |
| | | | | 707/707 |
| 7,974,714 | B2 * | 7/2011 | Hoffberg | H04N 7/163 |
| | | | | 700/94 |
| 8,214,079 | B2 * | 7/2012 | Lee | G05D 1/0274 |
| | | | | 700/245 |
| 8,639,644 | B1 * | 1/2014 | Hickman | G06N 3/008 |
| | | | | 706/14 |
| 8,892,495 | B2 * | 11/2014 | Hoffberg | G06F 7/023 |
| | | | | 706/48 |
| 9,140,541 | B2 * | 9/2015 | Kurihara | G01B 11/028 |
| 9,595,134 | B2 * | 3/2017 | Ramalingam | G06T 7/536 |
| 10,049,477 | B1 * | 8/2018 | Kokemohr | G06T 11/60 |
| 10,192,115 | B1 * | 1/2019 | Sheffield | G06N 20/00 |
| 10,361,802 | B1 * | 7/2019 | Hoffberg-Borghesani | |
| | | | | G11B 27/11 |
| 10,546,196 | B2 * | 1/2020 | Witt | G06K 9/6282 |
| 10,606,269 | B2 * | 3/2020 | Millard | G05D 1/0274 |
| 2008/0243305 | A1 * | 10/2008 | Lee | G05D 1/0297 |
| | | | | 700/246 |
| 2009/0184823 | A1 * | 7/2009 | Tessier | G06Q 10/06 |
| | | | | 340/568.1 |
| 2010/0097441 | A1 * | 4/2010 | Trachtenberg | H04N 7/152 |
| | | | | 348/14.08 |
| 2011/0025689 | A1 * | 2/2011 | Perez | A63F 13/213 |
| | | | | 345/420 |
| 2011/0244901 | A1 * | 10/2011 | Sugahara | H04W 16/18 |
| | | | | 455/501 |
| 2012/0041722 | A1 * | 2/2012 | Quan | G06T 17/05 |
| | | | | 703/1 |
| 2013/0084007 | A1 * | 4/2013 | Salamati | G06T 7/143 |
| | | | | 382/173 |
| 2013/0166193 | A1 * | 6/2013 | Goldman | G01C 21/206 |
| | | | | 701/410 |
| 2013/0259308 | A1 * | 10/2013 | Klusza | G06F 30/13 |
| | | | | 382/103 |
| 2014/0343846 | A1 * | 11/2014 | Goldman | G01C 21/165 |
| | | | | 701/525 |
| 2015/0078667 | A1 * | 3/2015 | Yun | G06F 16/583 |
| | | | | 382/195 |
| 2016/0112729 | A1 * | 4/2016 | Sayed | H04N 21/2668 |
| | | | | 725/10 |
| 2016/0238690 | A1 * | 8/2016 | Colucci | G01S 5/0257 |
| 2016/0282126 | A1 * | 9/2016 | Watts | H04W 4/029 |
| 2017/0076016 | A1 * | 3/2017 | Mir Ahmadi | G06F 30/13 |
| 2017/0206430 | A1 * | 7/2017 | Abad | G06T 3/00 |
| 2018/0047193 | A1 * | 2/2018 | Gao | G06T 7/248 |
| 2018/0137191 | A1 * | 5/2018 | Yan | G06F 16/9535 |
| 2018/0365898 | A1 * | 12/2018 | Costa | G06F 3/011 |
| 2019/0057538 | A1 * | 2/2019 | Chen | G06K 9/00201 |

FOREIGN PATENT DOCUMENTS

| | | |
|---|---|---|
| CN | 106846466 A | 6/2017 |
| CN | 106850843 A | 6/2017 |

OTHER PUBLICATIONS

Weiss et al. ("Automated Layout Synthesis and Visualization From Images of Interior or Exterior Spaces", IEEE, 2017, pp. 41-47) (Year: 2017).*

Tashakkori et al. ("A new 3D indoor/outdoor spatial model for indoor emergency response facilitation", Elsevier Ltd., 2015, pp. 170-182) (Year: 2015).*

Zhang et al. ("Three-Dimensional Modeling and Indoor Positioning for Urban Emergency Response", 2017, ISPRS Int. J. Geo-Inf. , pp. 1-14) (Year: 2017).*

Zheng, Guirong, "Research on Technology of Rapid Modeling and Optimizing Indoor 3D Scene for Virtual Exhibition" Chinese Master Thesis Paper of University of Zhejiang University; (Jul. 2012); pp. 1138-2012; English abstract at p. 17/119.

The Chinese First Examination Report of Chinese application No. 201710573845.3, dated May 24, 2019.

* cited by examiner

METHOD AND APPARATUS FOR ADAPTIVELY CONSTRUCTING THREE-DIMENSIONAL INDOOR SCENARIO

CROSS-REFERENCE TO RELATED APPLICATION

This application claims priority to Chinese Patent Application No. 201710573845.3, filed on Jul. 14, 2017, which is hereby incorporated by reference in its entirety.

TECHNICAL FIELD

The present disclosure relates to the field of computer technologies and, in particular, to a method and an apparatus for adaptively constructing a three-dimensional indoor scenario.

BACKGROUND

As the technology for modeling a three-dimensional scenario develops and indoor object (or indoor object category) model resources overflows, construction of the three-dimensional scenario has received increasing attentions in recent years. One of the essential research topics includes how to gear up the construction of the three-dimensional scenario with more automation.

In the prior art, a person who seeks to build a three-dimensional scenario typically has to begin by manually selecting an indoor object category, which has to be determined before any automatic layout creation is possible, leading to low efficiency in constructing the three-dimensional scenario.

SUMMARY

The disclosure provides a method and apparatus to help improving the efficiency in constructing the three-dimensional scenario.

Embodiments of the present disclosure provide a method for adaptively constructing a three-dimensional indoor scenario, including:

establishing an object association map corresponding to different scenario categories according to an annotated indoor layout;

selecting a corresponding target indoor object according to room information inputted by a user and the object association map, where the room information includes a room type and a designated indoor object;

generating a target indoor layout according to preset room parameters inputted by the user and the annotated indoor layout, where the preset room parameters include a room type parameter and a plot ratio parameter; and constructing a three-dimensional indoor scenario according to the target indoor object and the target indoor layout.

In an embodiment of the present disclosure, the establishing an object association map corresponding to different scenario categories according to an annotated indoor layout includes:

prefetching the annotated indoor layout;

determining an association weight corresponding to each indoor object according to the annotated indoor layout; and establishing an object association map corresponding to different scenario categories according to the association weight.

In an embodiment of the present disclosure, the selecting a corresponding target indoor object according to room information inputted by a user and the object association map includes:

determining a scenario category of a room according to room information inputted by the user;

determining the object association map corresponding to the scenario category according to the scenario category; and selecting a corresponding target indoor object according to the object association map.

In an embodiment of the present disclosure, the determining the room scenario category according to the room information inputted by the user includes:

determining a room scenario category according to $$\operatorname{argmin}_{\tilde{S}} \frac{\left|\theta_r - \sum_{\tilde{S}} \tilde{\theta}_r^{s_i}\right|}{\theta_r}$$

satisfying $$\max_{s_i \in \tilde{S}} P(o_j | s_i) > 0 \text{ and } \sum_{s_i \in \tilde{S}} N(o_j, s_i) \geq n_{o_j}, \forall o_j \in \tilde{O},$$

where $\theta_r$ is an area of a room associated with the inputted room information, $$\sum_{\tilde{S}} \tilde{\theta}_r^{s_i}$$

is the average area of all scenario categories in the scenario category set $S^{\%}$; $P(o_j|s_i)$ is the probability that the indoor object $o_j$ be included in the scenario category $s_i$; $N(o_j,s_i)$ is the maximum number of $o_j$ existing in a single planar layout among all planar layouts of $s_i$, and $n_{o_j}$ is the number of indoor objects in a user-designated object category set $\{o_j\}$.

In an embodiment of the present disclosure, the generating a target indoor layout according to preset room parameters inputted by the user and the annotated indoor layout includes:

selecting at least two intermediate indoor layouts among the annotated indoor layout according to the room parameter; and applying a weighted combination to the at least two intermediate indoor layouts to generate a target indoor layout.

Embodiments of the present disclosure also provide an apparatus for adaptively constructing a three-dimensional indoor scenario, including:

an establishing unit, configured to establish an object association map corresponding to different scenario categories according to an annotated indoor layout;

a selecting unit, configured to select a corresponding target indoor object according to room information inputted by a user and the object association map, wherein the room information includes a room type and a designated indoor object;

a generating unit, configured to generate a target indoor layout according to preset room parameters inputted by the user and the annotated indoor layout, wherein the preset room parameters include a room type parameter and a plot ratio parameter; and a constructing unit, configured to construct a three-dimensional indoor scenario according to the target indoor object and the target indoor layout.

In an embodiment of the present disclosure, the establishing unit is configured to: prefetch the annotated indoor layout; determine an association weight corresponding to each indoor object according to the annotated indoor layout; and create an object association map corresponding to different scenario categories according to the association weight.

In an embodiment of the present disclosure, the selecting unit is configured to: determine the room scenario category according to room information inputted by the user; determine an object association map corresponding to the scenario category according to the scenario category; and select a corresponding target indoor object according to the object association map.

In an embodiment of the present disclosure, the selecting unit is configured to determine a room scenario category according to $$\mathrm{argmin}_{\tilde{S}} \frac{\left|\theta_r - \sum_{\tilde{S}} \tilde{\theta}_r^{s_i}\right|}{\theta_r}$$

while $$\max_{s_i \in \tilde{S}} P(o_j | s_i) > 0 \text{ and } \sum_{s_i \in \tilde{S}} N(o_j, s_i) \geq n_{o_j}, \forall o_j \in \tilde{O},$$

where $\theta_r$ is an area of a room associated with the inputted room information, $$\sum_{\tilde{S}} \tilde{\theta}_r^{s_i}$$

is the average area of all scenario categories in the scenario category set $S^\%$; $P(o_j|s_i)$ is the probability that the indoor object $o_j$ be included in the scenario category $s_i$; $N(o_j,s_i)$ is the maximum number of $o_j$ existing in a single planar layout among all planar layouts of $s_i$, and $n_{o_j}$ is the number of indoor objects in a user-designated object category set $\{o_j\}$.

In an embodiment of the present disclosure, the generating unit is configured to: select at least two intermediate indoor layouts among the annotated indoor layout according to the room parameter; and apply a weighted combination to the at least two intermediate indoor layouts to generate a target indoor layout.

The method and apparatus for adaptively constructing a three-dimensional indoor scenario provided in embodiments of the present disclosure create an object association map corresponding to different scenario categories according to an annotated indoor layout, select a corresponding target indoor object according to room information inputted by a user and the object association map, generate a target indoor layout according to preset room parameters inputted by the user and the annotated indoor layout, and construct a three-dimensional indoor scenario according to the target indoor object and the target indoor layout. It can be seen from the above that the method and apparatus for adaptively constructing the three-dimensional indoor scenario according to the embodiments of the present disclosure realize automatic construction of the three-dimensional indoor scenario and avoid the need to manually select the indoor object category, improving the efficiency for constructing the three-dimensional scenario.

BRIEF DESCRIPTION OF THE DRAWINGS

In order to make technical solutions in the embodiments of the present invention or the prior art clearer, accompanying drawings used for description of the embodiments or the prior art will be briefly described hereunder. Obviously, the described drawings are some embodiments of present invention. For persons skilled in the art, other drawings may be obtained based on these drawings without any creative effort.

DETAILED DESCRIPTION

The technical solutions of the embodiments of the disclosure are described clearly and completely in conjunction with the accompanying drawings as follows. Apparently, the described drawings are merely a part of but not all of the embodiments according to the disclosure. Any and All other embodiments obtained by persons of ordinary skill in the art based on the presently disclosed embodiments without making any creative effort shall fall into the protection scope of the present disclosure.

The terms "first", "second", "third", "fourth" or the like, whether in the description, claims or the figures, are used for distinguishing similar objects, rather than for describing any particular sequence or order. It should be understood that any numeral used as such are interchangeable whenever appropriate in order to help describing the disclosed embodiments, e.g., to demonstrate a potential in being implemented in orders other than those depicted or described. Moreover, the terms "include", "have" and any variation thereof are intended to cover a non-exclusive inclusion, e.g., a process, method, system, product or device may include, but not necessarily limited to, those steps or units explicitly described. Instead, the process, method, system, product or device may include any other steps or units that are, although not clearly listed, inherent thereto.

It should be noted that the particular embodiments may be recombined, and same or similar concepts or processes might not be repeated in some embodiments.

Figure 1:
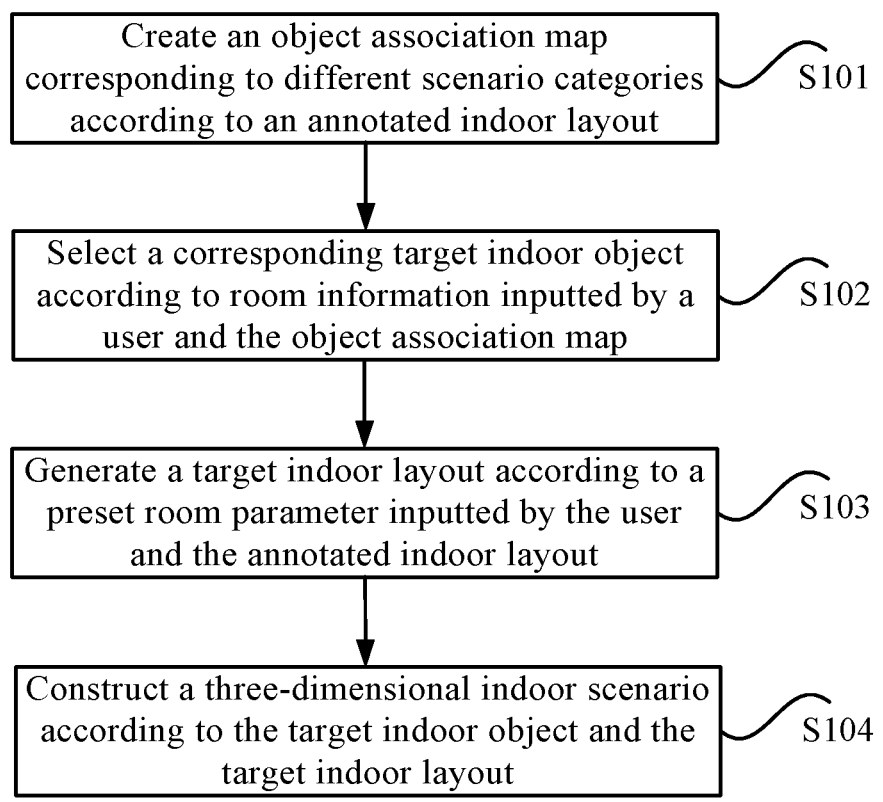
FIG. 1 is a flow chart illustrating a method for adaptively constructing a three-dimensional indoor scenario according to an embodiment of the present disclosure.

FIG. 1 is a flow chart illustrating a method for adaptively constructing a three-dimensional indoor scenario according to a disclosed embodiment. Of course, the disclosed embodiment is merely being explained using FIG. 1 as an illustration, rather than being limited thereto. The method for adaptively constructing the three-dimensional indoor scenario may be implemented by an apparatus for adaptively constructing the three-dimensional indoor scenario. As an illustration, the apparatus for adaptively constructing the three-dimensional indoor scenario may be independently provided or integrated into a processor. As shown in FIG. 1, the method for adaptively constructing the three-dimensional indoor scenario may include:

S101: establishing an object association map corresponding to different scenario categories according to an annotated indoor layout.

Illustratively, in an embodiment of the present disclosure, an annotated two-dimensional indoor layout, which may be pre-collected and/or obtained, may be used as a data set, based on which an object association map corresponding to different scenario categories may be created.

S102: selecting a corresponding target indoor object according to room information inputted by a user and the object association map.

The room information includes a room type and a designated indoor object. Further, the room type may include information such as room dimension and position of, e.g., a door, a window, etc. The designated indoor object may include a bed, a sofa, a television, etc.

After the object association map is determined, a recommendation result may be automatically adjusted according to the room type inputted by the user, the designated indoor object and the object association map, and thus the corresponding target indoor object is adaptively selected.

S103: generating a target indoor layout according to preset room parameters inputted by the user and the annotated indoor layout.

The preset room parameters include a room type parameter and a plot ratio parameter.

S104: constructing a three-dimensional indoor scenario according to the target indoor object and the target indoor layout.

After the target indoor object and target indoor layout are determined adaptively, a three-dimensional indoor scenario may be constructed according to the target indoor object and the target indoor layout, thereby realizing automatic construction of the three-dimensional indoor scenario and avoiding the need to manually select any indoor object category, improving the efficiency for constructing the three-dimensional scenario.

According to the embodiments of the present disclosure, a method for adaptively constructing a three-dimensional indoor scenario is implemented by: establishing an object association map corresponding to different scenario categories according to an annotated indoor layout; adaptively selecting a corresponding target indoor object according to room information inputted by a user and the object association map; generating a target indoor layout according to preset room parameters inputted by the user and the annotated indoor layout; and constructing a three-dimensional indoor scenario according to the target indoor object and the target indoor layout. It can be seen from the above that the method for adaptively constructing the three-dimensional indoor scenario according to the embodiments of the present disclosure realize automatic construction of the three-dimensional indoor scenario and avoid the need to manually select the indoor object category, improving the efficiency for constructing the three-dimensional scenario.

Figure 2:
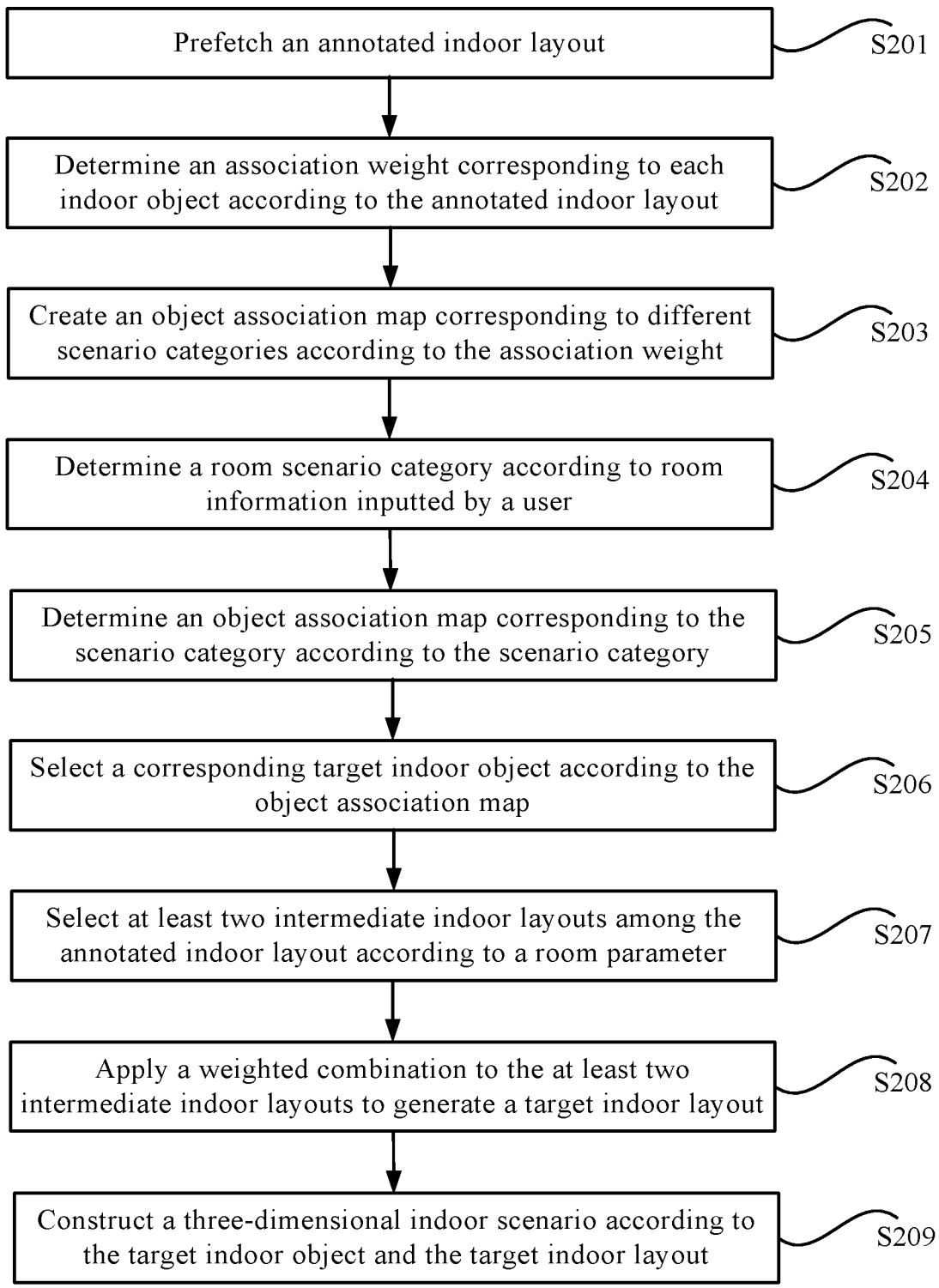
FIG. 2 is a flow chart illustrating another method for adaptively constructing a three-dimensional indoor scenario according to an embodiment of the present invention.

Based on the embodiment corresponding to FIG. 1, further, reference may be made to FIG. 2, which is a flow chart illustrating another method for adaptively constructing a three-dimensional indoor scenario according to a disclosed embodiment. Of course, the disclosed embodiment is merely being explained using FIG. 2 as an illustration, rather than being limited thereto. Referring to FIG. 2, the method may also include:

S201: prefetching an annotated indoor layout.

Illustratively, in an embodiment of the present disclosure, an annotated two-dimensional indoor layout, which may be pre-collected and/or obtained, may be used as an basis upon which an object association map corresponding to different scenario categories may be created.

S202: determining an association weight corresponding to each indoor object according to the annotated indoor layout.

Illustratively, the annotated two-dimensional indoor layout thus obtained may be used as a data set in counting up, for a particular category of indoor scenario (such as a bedroom, a living room, etc.), a frequency at which each pair of indoor objects co-exist. Meanwhile, an interactive relationship between the indoor objects may be detected according to a user position annotated in the two-dimensional indoor layout, and the association weight corresponding to each indoor object may be obtained by additionally considering an interaction type for each of the indoor objects.

S203: establishing an object association map corresponding to different scenario categories according to the association weight.

When establishing the object association map, a fully connected association map is constructed first, where a node in the fully connected association map is a different indoor object category, and an edge is a relation between two categories. The association weight obtained in S202 corresponding to each indoor object is used in assigning a weight to an edge in the fully connected association map. Any edge with the weight of 0 is removed, and any isolated node thus created is also removed. Thus, an object association map corresponding to different scenario categories is created.

Figure 3:
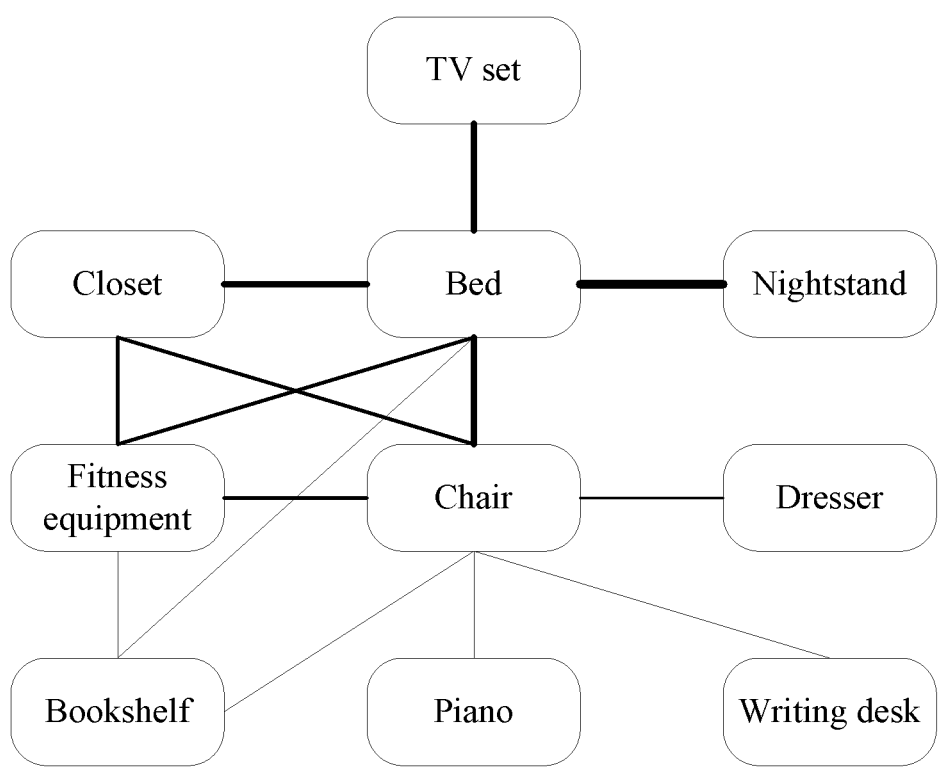
FIG. 3 is a schematic diagram of an association map for an indoor object provided by an embodiment of the present disclosure.

Illustratively, reference may be to FIG. 3, which is a schematic diagram of an association map for an indoor object provided by an embodiment of the present disclosure. The indoor object in FIG. 3 may include a television set, a closet, a bed, a bedside cabinet, fitness equipment, a chair, a dresser, a bookshelf, a piano and a desk. A line between two indoor objects is used to represent an association between the two indoor objects. The thickness of the line indicates the weight between the two indoor objects, and a thicker line indicates greater association weight, while a thinner line indicates a smaller association weight.

S204: determining a scenario category of a room according to room information inputted by a user.

The room information includes a room type and a designated indoor object. Further, the room type may include information such as room dimension and position of, e.g., a door, a window, etc. The designated indoor object may include a bed, a sofa, a television, etc.

When adaptively determining the room scenario category according to the room type inputted by the user and a small number of designated indoor objects, the scenario category is determined firstly for the inputted room, and a scenario category set $S^\%$ including one or more scenario categories is selected according to a small collection $O^\%$ of indoor objects designated by the user. If only one scenario category is included in the $S^\%$, the scenario category will be the very scenario category for the input room. Or, if a plurality of categories are included, the inputted room will be divided into different regions according to an average area of different scenario categories, and each region will be generated using the different scenario categories. Optionally, in an embodiment of the present disclosure, the S204: determining a room scenario category according to room information inputted by a user may include:
determining a room scenario category according to $$\operatorname{argmin}_{\tilde{S}} \frac{\left|\theta_r - \sum_{\tilde{S}} \tilde{\theta}_r^{s_i}\right|}{\theta_r}$$

satisfying $$\max_{s_i \in \tilde{S}} P(o_j | s_i) > 0 \text{ and } \sum_{s_i \in \tilde{S}} N(o_j, s_i) \geq n_{o_j}, \forall o_j \in \tilde{O},$$

where $\theta_r$ is an area of a room associated with the inputted room information, $$\sum_{\tilde{S}} \tilde{\theta}_r^{s_i}$$

is the average area of all scenario categories in the scenario category set $S^{\%}$; $P(o_j|s_i)$ is the probability that the indoor object $o_j$ be included in the scenario category $S^{\%}$; $N(o_j, s_i)$ is the maximum number of $o_j$ existing in a single planar layout among all planar layouts of $s_i$, and $n_{o_j}$ is the number of indoor objects in a user-designated object category set $\{o_j\}$.

S205: determining an object association map corresponding to the scenario category according to the scenario category.

S206: selecting a corresponding target indoor object according to the object association map.

After the scenario category is determined according to the room information inputted by the user, an object association map corresponding to the scenario category is selected. Remove an indoor object, one for each time, from the node of the object association map, and then determine which indoor object is/are to remain according to a determination of whether a ratio of the total area of the remaining indoor objects to the area of the room is close to the average ratio obtained from the statistics from the two-dimensional indoor layout. The indoor object removed corresponds to a node that has the lowest average association with neighboring nodes on the object association map. In this way, the corresponding target indoor object is determined.

S207: selecting at least two intermediate indoor layouts among the annotated indoor layout according to a room parameter.

The preset room parameters include a room type parameter and a plot ratio parameter. Illustratively, in an embodiment of the present disclosure, the number of intermediate indoor layouts selected may be 5 or 7 or even 10, which may be configured according to specific needs. Typically, the number of intermediate indoor layouts may be an integer greater than or equal to 5 and less than or equal to 10.

According to door positions, align the annotated two-dimensional indoor layout that have been pre-fetched, and extract from the layout a binary map template in which a region occupied by a furniture is represented by 0-s and an unoccupied region is represented by 1-s. scale the two-dimensional indoor layout into a binary map template at a dimension of 10*10, then rearrange these templates into a row vector, using which a cluster analysis may be applied to two-dimensional indoor layouts of a common category, where two-dimensional indoor layouts of a common category have a similarity in their layouts. Meanwhile, extract a parameter such as an angle between the positions of a door or window of the room in the two-dimensional indoor layout and the center point thereof, a ratio of the total area of the indoor object to the area of the room, a length-width ratio and use these as characteristics. Since the dimension of the inputted room, the position of the door and window and the indoor object have already been determined, characteristics of one input room can thus be obtained. Search the two-dimensional indoor layout using these characteristics to select at least two intermediate indoor layouts. Illustratively, in an embodiment of the present disclosure, the first 10 of the most similar intermediate indoor layouts are selected. These 10 intermediate indoor layouts are similar in terms of their indoor layouts.

S208: applying a weighted combination to the at least two intermediate indoor layouts to generate a target indoor layout.

The 10 layouts are, after being determined, scaled, and the scaled binary map template is compared with a room parameter inputted by the user, then the target indoor layout may be generated by applying the weighted combination to the similarity weights.

S209: constructing a three-dimensional indoor scenario according to the target indoor object and the target indoor layout.

After the target indoor object and the target indoor layout are determined, the target indoor object may be arranged in a dimensionally descending order according to the generated target indoor layout. That is, a bounding box of one indoor object is subject to a planar projection, a location is identified in the binary map template, such that the total area covered by the location in the binary map template is minimized. Then, the covered area is set to 1. Then, move on to place the next object. In this manner, the selected target indoor object and the small number of indoor objects designated by the user are placed one at a time into the room inputted by the user, until the construction of the three-dimensional indoor scenarios is completed. It can be seen from the above that the method for adaptively constructing the three-dimensional indoor scenario according to the embodiments of the present disclosure realize automatic construction of the three-dimensional indoor scenario and avoid the need to manually select the indoor object category, improving the efficiency for constructing the three-dimensional scenario.

During a practical use, an annotated indoor layout is prefetched; an association weight corresponding to each indoor object is determined according to the annotated indoor layout; before an object association map corresponding to different scenario categories is created according to the association weight. Then, the scenario category is determined according to the room information inputted by the user, and a corresponding target indoor object is adaptively selected according to the object association map. After that, at least two intermediate indoor layouts are selected among the annotated indoor layout according to a room parameter. A weighted combination is applied to the at least two intermediate indoor layouts to generate a target indoor layout. After the target indoor object and target indoor layout are determined, a three-dimensional indoor scenario may be constructed according to the target indoor object and the target indoor layout. It can be seen from the above that the method for adaptively constructing the three-dimensional indoor scenario according to the embodiments of the present disclosure realize automatic construction of the three-dimensional indoor scenario and avoid the need to manually select the indoor object category, improving the efficiency for constructing the three-dimensional scenario.

Figure 4:
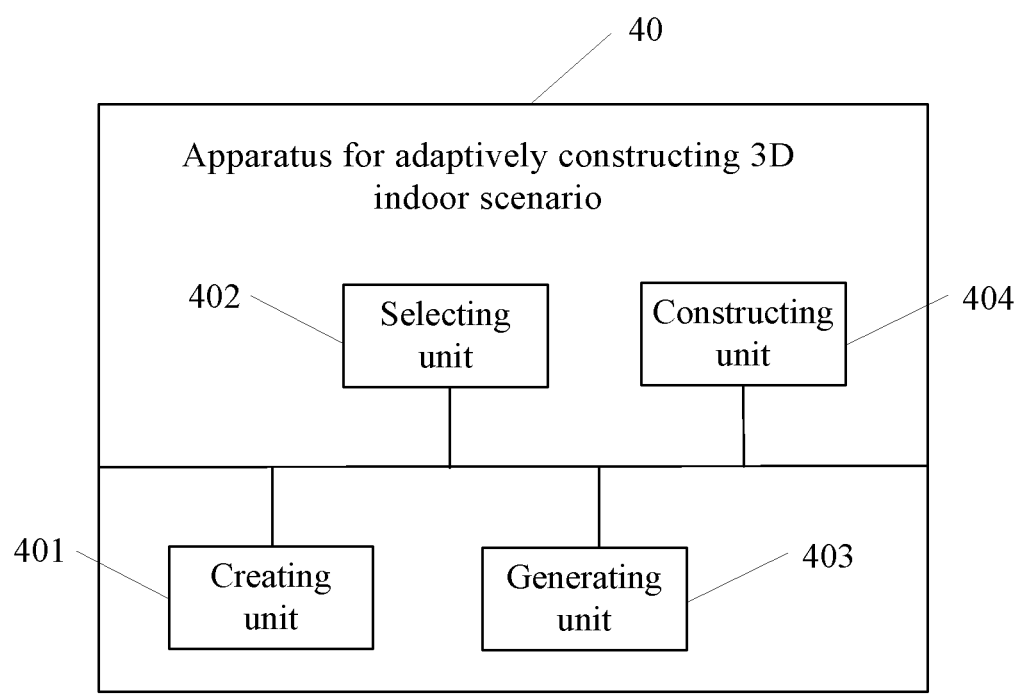
FIG. 4 is a schematic structural diagram illustrating an apparatus for adaptively constructing a three-dimensional indoor scenario according to an embodiment of the present disclosure.

FIG. 4 is a schematic structural diagram illustrating an apparatus 40 for adaptively constructing a three-dimensional indoor scenario according to a disclosed embodiment. Of course, the disclosed embodiment is merely being explained using FIG. 4 as an illustration, rather than being limited thereto. As shown in FIG. 4, the apparatus 40 for adaptively constructing the three-dimensional indoor scenario may include:

an establishing unit 401, configured to establish an object association map corresponding to different scenario categories according to an annotated indoor layout;

a selecting unit 402, configured to select a corresponding target indoor object according to room information inputted by a user and the object association map, wherein the room information includes a room type and a designated indoor object;

a generating unit 403, configured to generate a target indoor layout according to preset room parameters inputted by the user and the annotated indoor layout, wherein the preset room parameters include a room type parameter and a plot ratio parameter; and a constructing unit 404, configured to construct a three-dimensional indoor scenario according to the target indoor object and the target indoor layout.

Optionally, the establishing unit 401 may be configured to: prefetch an annotated indoor layout; determine an association weight corresponding to each indoor object according to the annotated indoor layout; and create an object association map corresponding to different scenario categories according to the association weight.

Optionally, the selecting unit 402 may be configured to: determine a room scenario category according to room information inputted by a user; determine an object association map corresponding to the scenario category according to the scenario category; and select a corresponding target indoor object according to the object association map.

Optionally, the selecting unit 402 may be configured to determine a room scenario category according to $$\operatorname{argmin}_{\tilde{S}} \frac{\left|\theta_r - \sum_{\tilde{S}} \tilde{\theta}_r^{s_i}\right|}{\theta_r}$$

while $$\max_{s_i \in \tilde{S}} P(o_j | s_i) > 0 \text{ and } \sum_{s_i \in \tilde{S}} N(o_j, s_i) \geq n_{o_j}, \forall o_j \in \tilde{O},$$

where $\theta_r$ is an area of a room associated with the inputted room information, $$\sum_{\tilde{S}} \tilde{\theta}_r^{s_i}$$

is the average area of all scenario categories in the scenario category set $S^{\%}$; $P(o_j|s_i)$ is the probability that the indoor object $o_j$ be included in the scenario category $s_i$; $N(o_j, s_i)$ is the maximum number of $o_j$ existing in a single planar layout among all planar layouts of $s_i$, and $n_{o_j}$ is the number of indoor objects in a user-designated object category set $\{o_j\}$.

Optionally, the generating unit 403 may be configured to: select at least two intermediate indoor layouts among the annotated indoor layout according to the room parameter; and apply a weighted combination to the at least two intermediate indoor layouts to generate a target indoor layout.

The apparatus 40 for adaptively constructing the three-dimensional indoor scenario shown in the disclosed embodiments is capable of carrying out the technical solution shown in the foregoing method embodiments following similar implementation principals and producing similar advantageous effects, neither of which will be repeated herein.

Finally, it should be noted that the foregoing embodiments are merely intended for describing, rather than limiting, the technical solutions of the present disclosure. Although the present disclosure is described in detail with reference to the foregoing embodiments, persons of ordinary skill in the art should understand that it remains possible to make modifications to the technical solutions described in the foregoing embodiments, or make equivalent replacements to some or all technical features therein. However, these modifications or replacements do not make the essence of corresponding technical solutions depart from the scope of the technical solutions in the embodiments of the present disclosure.

What is claimed is:

1. A method for adaptively constructing a three-dimensional indoor scenario, comprising:
    establishing an object association map corresponding to different scenario categories according to an annotated indoor layout;
    selecting a corresponding target indoor object according to room information inputted by a user and the object association map, wherein the room information comprises a room type and a designated indoor object;
    generating a target indoor layout according to preset room parameters inputted by the user and the annotated indoor layout, wherein the preset room parameters comprise a room type parameter and a plot ratio parameter, the plot ratio parameter refers to a ratio of a total area of all indoor objects to an area of a room; and
    constructing a three-dimensional indoor scenario according to the target indoor object and the target indoor layout;
    wherein the selecting a corresponding target indoor object according to room information inputted by a user and the object association map comprises:
    determining a scenario category of a room according to the room information inputted by the user;
    determining the object association map corresponding to the scenario category according to the scenario category; and
    selecting the corresponding target indoor object according to the object association map;
    wherein the determining a scenario category of a room according to the room information inputted by the user comprises:

$$\operatorname{argmin}_{\tilde{S}} \frac{\left|\theta_r - \sum_{\tilde{S}} \tilde{\theta}_r^{s_i}\right|}{\theta_r}$$

determining the scenario category of the room according to $$\max_{s_i \in \tilde{S}} P(o_j | s_i) > 0 \text{ and } \sum_{s_i \in \tilde{S}} N(o_j, s_i) \geq n_{o_j}, \forall o_j \in \tilde{O},$$

satisfying wherein $\theta_r$ is an $$\sum_{\tilde{S}} \tilde{\theta}_r^{s_i}$$

area of a room associated with the inputted room information, is the average area of all scenario categories in the scenario category set $S^{\%}$; $P(o_j|s_i)$ is the probability that the indoor object $o_j$ be included in the scenario category $s_i$; $N(o_j, s_i)$ is the maximum number of $o_j$ existing in a single planar layout among all planar layouts of $s_i$, and $n_{o_j}$ is the number of indoor objects in a user-designated object category set $\{o_j\}$.

2. The method according to claim 1, wherein the establishing an object association map corresponding to different scenario categories according to an annotated indoor layout comprises:
   prefetching the annotated indoor layout;
   determining an association weight corresponding to each indoor object according to the annotated indoor layout; and
   establishing the object association map corresponding to different scenario categories according to the association weight.

3. The method according to claim 1, wherein the generating a target indoor layout according to preset room parameters inputted by the user and the annotated indoor layout comprises:
   selecting at least two intermediate indoor layouts among the annotated indoor layout according to the room parameter; and
   applying a weighted combination to the at least two intermediate indoor layouts to generate the target indoor layout.

4. An apparatus for adaptively constructing a three-dimensional indoor scenario, comprising a processor, wherein the processor is configured to:
   establish an object association map corresponding to different scenario categories according to an annotated indoor layout;
   select a corresponding target indoor object according to room information inputted by a user and the object association map, wherein the room information comprises a room type and a designated indoor object;
   generate a target indoor layout according to preset room parameters inputted by the user and the annotated indoor layout, wherein the preset room parameters comprise a room type parameter and a plot ratio parameter, the plot ratio parameter refers to a ratio of a total area of all indoor objects to an area of a room; and
   construct a three-dimensional indoor scenario according to the target indoor object and the target indoor layout;
   wherein the processor is further configured to:
   determine a scenario category of a room according to the room information inputted by the user; determine an object association map corresponding to the scenario category according to the scenario category; and select the corresponding target indoor object according to the object association map;

$$\arg\min_{\tilde{S}} \frac{\left| \theta_r - \sum_{\tilde{S}} \tilde{\theta}_r^{s_i} \right|}{\theta_r},$$

determine a room scenario category according to $$\max_{s_i \in \tilde{S}} P(o_j | s_i) > 0 \text{ and } \sum_{s_i \in \tilde{S}} N(o_j, s_i) \geq n_{o_j}, \forall o_j \in \tilde{O},$$

satisfying wherein $\theta_r$ is an $$\sum_{\tilde{S}} \tilde{\theta}_r^{s_i}$$

area of a room associated with the inputted room information, is the average area of all scenario categories in the scenario category set $S^{\%}$; $P(o_j|s_i)$ is the probability that the indoor object $o_j$ be included in the scenario category $s_i$; $N(o_j, s_i)$ is the maximum number of $o_j$ existing in a single planar layout among all planar layouts of $s_i$, and $n_{o_j}$ is the number of indoor objects in a user-designated object category set $\{o_j\}$.

5. The apparatus according to claim 4, wherein the processor is further configured to:
   the establishing unit is configured to: prefetch the annotated indoor layout; determine an association weight corresponding to each indoor object according to the annotated indoor layout; and establish the object association map corresponding to different scenario categories according to the association weight.

6. The apparatus according to claim 4, wherein the processor is further configured to:
   select at least two intermediate indoor layouts among the annotated indoor layout according to the room parameter; and apply a weighted combination to the at least two intermediate indoor layouts to generate the target indoor layout.

\* \* \* \* \*